United States Patent [19]
Knobloch

[11] Patent Number: 4,794,891
[45] Date of Patent: Jan. 3, 1989

[54] METHOD FOR OPERATING AN INTERNAL COMBUSTION ENGINE

[76] Inventor: Hans Knobloch, Samhofer Weg 33a, Ingolstadt, Fed. Rep. of Germany

[21] Appl. No.: 107,030

[22] Filed: Oct. 8, 1987

[30] Foreign Application Priority Data

Oct. 13, 1986 [DE] Fed. Rep. of Germany ....... 3634832

[51] Int. Cl.$^4$ ............................................. F01L 9/04
[52] U.S. Cl. ........................... 123/90.11; 251/129.16; 361/159
[58] Field of Search ............. 123/90.11; 251/129.09, 251/129.10, 129.15, 129.16, 129.18; 335/256, 258, 262, 266, 268; 361/152, 159

[56] References Cited

U.S. PATENT DOCUMENTS

| | | | |
|---|---|---|---|
| 4,500,937 | 2/1985 | Matt | 361/159 x |
| 4,544,986 | 10/1985 | Buchl | 123/90.11 |
| 4,715,331 | 12/1987 | Kreuter | 251/129.16 X |
| 4,715,332 | 12/1987 | Kreuter | 123/90.11 |

FOREIGN PATENT DOCUMENTS 0359186 10/1931 United Kingdom ............. 123/90.11

*Primary Examiner*—Willis R. Wolfe
*Attorney, Agent, or Firm*—Jacques M. Dulin

[57] ABSTRACT

Method and apparatus for improving the operation of an internal combustion engine of the type having electromagnetically actuated gas exchange valves, in which the detachment time lag, the delay in release of the anchor plate from the electromagnet, is compensated-for in determining the proper time to shut-off current to the electromagnet. Embodiments include measuring individual electromagnet/anchor plate couple detachment times in the factory and presetting advances in the controller microprocessor, or contact sensing the total time of detachment plus flight during operation and compensating for the detachment time depending on calculated optimum time of shut-off, or engine operating conditions, including exhaust composition, cylinder pressure, ageing, temperature, knocking, engine output, and the like.

19 Claims, 1 Drawing Sheet

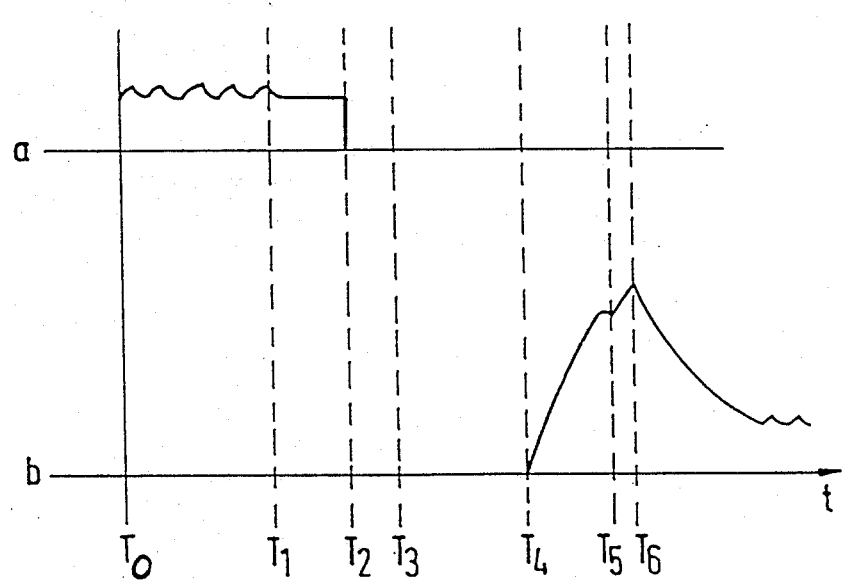

METHOD FOR OPERATING AN INTERNAL COMBUSTION ENGINE

FIELD

The invention relates to a method and apparatus for improving the operation of an internal combustion engine of the type having gas exchange valves which can be moved by spring suspension upon energizing or de-energizing an electromagnet in their opening or closing position. More particularly the invention relates to methods and apparatus for releasing the anchor plates at predetermined times or times responsive to engine operating conditions to compensate for lags in electro-magnetic detachment of the anchor plates from the solenoid electromagnet.

BACKGROUND

Examples of internal combustion engines of this type have been described in DE-OS No. 30 24 109 (U.S. Pat. No. 4,455,543), in DE-OS No. 35 00 530, and in DE-OS No. 35 13 107 (U.S. Pat. No. 4,682,574).

The internal combustion engines described therein have gas exchange valves which are moved from their opening to their closing position or vice versa by means of an electromagnet, which releases its hold on the gas exchange valve in one of its open or closed end positions when the electromagnet is either energized or de-energized. This, in turn, causes the gas exchange valve to move by spring suspension towards its other end position, where it is recaptured by a magnet.

In more detail, an anchor plate is suspended by opposed spring systems between a pair of spaced-apart electromagnets. The anchor plate is attracted and held by an electromagnet in one end point when energized. When de-energized the spring system moves the anchor plate back toward a centered or equilibrium position. The opposite electromagnet then attracts and holds the anchor plate in the other end position. The anchor plate can either be attached to the valve stem, or it may be held by a guide system so that a tappet member strikes the end of the valve stem and pushes the valve to the open position.

The opening or closing timing of the gas exchange valve can be predetermined by controlling the timing of the electromagnet.

It has nevertheless been shown that the exact moment of opening or closing of such electromagnetically actuated gas exchange valves is limited by an uncertainty factor, so that there can be irregularities in the operation of the internal combustion engine. There is a definite need in the art to improve engine operation and life through more precise control of valve operation.

THE INVENTION

OBJECTS

It is among the objects of the invention to provide methods and apparatus for operation of an internal combustion engine by which the point in time (time points) of opening and closing the gas exchange valves can be precisely set, maintained and controlled.

It is another object of the invention to provide methods and apparatus for determining the detachment time of release of an anchor plate from its electromagnet, and compensating for that delay in setting and controlling the electromagnet current shut-off time point.

It is another object of the invention to provide methods and apparatus for improving the operation of internal combustion engines by adjusting the time of current cut-off to exhaust and/or take valve system electromagnets during operation in response to operating conditions, such as load, fuel, ageing, temperature, exhaust composition, cylinder pressure, output performance, knocking and the like.

It is another object of the invention to provide methods and apparatus for improving engine performance by measuring individual electromagnet/anchor couple detachment times and providing for appropriate advances in the current shut-off in the ignition system microprocessor, or in other engine electronic control system hardware, software or firmware.

It is still another object of the invention to provide methods and apparatus for improving engine performance by providing a self-learning system of adjusting valve system electromagnetic shut-off times.

It is another object to provide methods and apparatus for controlling the operation of an internal combustion engine by precalculating the desired valve system electromagnetic shut-off and presetting that shut-off in accord with anchor release delay.

Still other objects will be evident from the specification and drawing in this case.

DRAWING

The invention is illustrated in more detail by reference to the drawing in which:

The FIGURE is a graph of the current flow vs. time through the two electromagnets during one-half cycle of operation, which graph identifies the time points detected and/or controlled by the methods of the invention.

SUMMARY

I have found that the total length of time from the moment when the electromagnet is switched on or off to the moment of anchor contact at the opposite end position is composed of the flight time of the anchor and a certain detachment time which the anchor needs in order to free itself from the poles of the electromagnet in the start position. Upon closer observation I have found that the flight time is relatively constant and is therefore easily reproducible. The attachment time, on the other hand, varies and is subject to a variety of influences.

Measurement of couplings of the different anchors with different electromagnets shows great variation in the detachment time, i.e., the detachment times show what may be called "scatter" in time values. In a first embodiment of the invention, the detachment time of each individual anchor and electromagnet "couple" is measured at the factory and provided as a preset value and/or time to the microprocessor logic in the electromagnetic ignition or valve control system to produce the exact electromagnet shut-off time. Accordingly, this measured and predetermined detachment time is included in determining the exact time at which to switch the electromagnet on or off. The detachment time is therefore measured individually for each electromagnet-anchor couple, and provided by a corresponding preset in the logic. This may be done either by presetting the resistance value in the hardware or similar part, or by programming the microprocessor software or firmware to that effective value.

This method may be applied to a variety of electronic ignition systems where the valves are electromagnetically actuated, whether the anchor plate is attached to a valve stem, as in DE-OS No. 3024 109 (U.S. Pat. No. 4,455,543), or is attached to a guide assembly and has a tappet which may be spaced from and strikes the end of the valve stem, as in DE-OS No. 3513 107 (U.S. Pat. No. 4,682,574).

For example, in the type of system where the anchor plate is secured to the valve stem, as shown in DE-OS No. 30 24 109 (U.S. Pat. No. 4,455,543), when the electromagnet is shut off, the valve moves. According to the present invention, the shut-off point or threshold, which begins the process of releasing the anchor from the electromagnet, is preset depending on the detachment time in order that the detachment time difference may be equalized (compensated-for). The actual time point for shut-off of the electromagnet is preset for each individual electromagnet/anchor couple's detachment time value (interval) in order to obtain the time point at which it has been calculated the anchor should fall away, or is desired to fall away.

In another embodiment, the compensation for the detachment time may be equalized during operation, rather than being present during manufacture, by sensing and recording the length of time between the electromagnet switching event and the moment at which the opposite end position of the gas exchange valve is reached. This is the total time described above. The flight time, being relatively constant can be deducted, and the detachment time which can vary during operation depending on load, fuel and operating conditions among others, is thus determinable. The electromagnetic shut-off time can be adjusted for the next time the same electromagnet/anchor couple is operated by taking into consideration the total time and the deduced detachment time Thus, the invention includes a self-learning system in which the total length of time is measured each time the electromagnet/anchor couple operates, and simple subtraction algorithm rules are used in order to determine and compensate for variations in the detachment time corresponding to the conditions. These algorithm rules can provide for an adaptive approximation of the desired detachment time value and compensated for to determine changes in the electromagnet shut-off time point, as in the example of knock regulation. In this way, the influence of aging and temperature can be taken into consideration and compensated-for.

One method of sensing for this type of self-learning system is by using contact or impact recognition, i.e. the impact of the valve with the seat, the anchor plate tappet with the end of the valve stem, or the anchor plate with the electromagnet face.

In the alternative, one can vary various parameters which are indirectly connected to the exact opening or closing time point. For example, the composition of the exhaust can be measured, and is optimized by varying the individual time of detachment by means of the ignition microprocessor advancing or delaying the electromagnet shut-off time point. Similarly, the output performance of the engine may be measured, or the inner cylinder pressure measured and optimized as described in accord with the method of this invention.

A calculation release time may be assigned to all electromagnets which corresponds to the desired anchor release time, and the detachment time is compensated-for by moving the switching time point (time point at which the electromagnet is switched off) forward (earlier in time or advanced) in each case from the release time.

While the method of the invention can be applied to release of the anchor plate from either or both electromagnets, the closing (upper) and opening (lower) electromagnet, it is not necessary to apply it to both in each cylinder. Thus, it lies within the framework of the invention not to provide the opening position electromagnet as well as that of the closing position with a detachment time correction corresponding to the invention. For example, in the case of an intake valve, assuming the exact closing time point at which the gas flow is interrupted at relatively high flow values is important for filling accuracy, it is sufficient to provide for detachment time correction only for the closing step of the intake valve (i.e., release from the open position electromagnet followed by capture by the closed position electromagnet).

The same is also true for the exhaust valve, although the exact timing of the opening and closing time points is not as critical for an exhaust valve as for the intake valve.

DETAILED DESCRIPTION OF THE BEST MODE OF THE INVENTION

The following detailed description of the best mode of carrying out the invention is by way of example and not by way of limitation of the principals of the invention, and is described by reference to the FIGURE.

The FIGURE shows a graph in relation to time of the relative current flow through the electromagnet in one of the end positions, the "curve" above the "a" abscissa, and through the electromagnet in the other end position, the curve above the "b" abscissa. This illustrative an electromagnetic valve positioning system where the electromagnet is shut off in the first position, for example the opening position "a", such that the anchor can then release itself from the electromagnet. The anchor is then pushed, by means of a spring system, close to the second, closing position electromagnet "b", which is then simultaneously energized. As a result of the energizing of the second electromagnet, the anchor is secured in the closed position of the gas exchange valve and stays there until the cycle of energizing and de-energizing the electromagnets begins in the reverse order. For details of the electromagnetically actuated valve system see DE-OS No. 30 24 109 (U.S. Pat. No. 4,455,543) and/or DE-OS No. 35 13 107 (U.S. Pat. No. 4,682,574), the disclosures of which are incorporated by reference to the extent needed for a full understanding of such systems.

On time axis a, the current through the electromagnet which holds the gas exchange valve in its opened position is represented. At time point T3, the movement of the gas exchange valve is to begin. Depending on the different detachment times, time points T2 and T1 are reported (calculated)) retroactively from this control time point threshold. From time point 0 until time point T1, a timed current flow, the holding current, is sufficient to hold the anchor to the electromagnet. Just before the current flow to the electromagnet is shut off, a transfer to a constant current phase takes place during the length of time between T1 and T2 in order to obtain a definite shut-off time point for the timed current shown on time axis a.

When the current is now shut off at time point T2, a spring system attempts to pry the anchor off of the electromagnet. However, there is a certain detachment time due to the time necessary for current decay or other factors, and the anchor is not actually released from the polar surface of the electromagnet until time point T3.

After this release at T3, a free flight phase takes place until the anchor is captured by the electromagnet on the opposite side. The electromagnet on the opposite side is energized at time point T4, such that when the anchor gets close to this electromagnet, it already has sufficient catch current to secure the anchor to the attracting pole. The flight phase lasts from time point T3 to time point T5. At time point T5 the anchor hits the electromagnet on the opposite side and is captured by it, which is represented by a brief drop in current at time point T5 in the current graph. Suggestions for utilizing this brief drop in current when the anchor hits for contact recognition have already been published, and is accordingly a known technique.

At time point T6, when the anchor has been securely captured by the pole of lower electromagnet b, the catch current is shut off, the current gradually drops to a holding current value at which it is maintained for the remaining time period of valve capture. In principle, a procedure of this type, for use of a timed holding current and raised catch current, is already known from DE-OS No. 28 28 678.

Flight time, T5−T3, is substantially constant since produced by the spring system, while the values for detachment time T3−T2 vary greatly, such that differences in total time T5−T2 are influenced above all by the varying detachment time. Accurate determination of the detachment time, for example directly after production when an internal combustion engine is manufactured at the plant, leads one to have to move the electromagnet shut-off time point T2 forward or in some cases even backward according to the different detachment times, in order to obtain the release of the anchor from the electromagnet exactly at desired time point T3.

It should also be considered that the preferred mode of the invention provides for time point T3 to be set by calculation. With a theoretical detachment time of zero, the compensation or correction value T3−T2 would be 0. Since in practice detachment times always occur, presetting is necessary only according to the individual value T3−T2, when T3 is taken as reference value; therefore presetting is only necessary in one direction, that is the current shut-off is present (earlier in time or advanced).

Improved engine performance can be achieved when, for example, the total time T5−T2 can be reported during operation by means of integrated collision recognition at time point T5, and accordingly, shut-off threshold time point T2 can be controlled such that the actual time point T5 coincides with the optimal time point for the operation of the internal combustion engine.

The apparatus for carrying out the method comprises means for alternatively supplying the current as shown in the FIGURE to the appropriate valve actuation electromagnets, a memory means for storing a time point (e.g. T3) for shut-off of current to the releasing electromagnet, with the memory means being settable to provide a signal for causing an advance in the shut-off of current to the releasing electromagnet by the amount of time corresponding to the detachment time period lag of the anchor from the electromagnet. As described above, the memory may be preset, e.g. at the factory or by measurement in a prior cycle, to provide the advance signal in an amount corresponding to individually measured or approximated detachment time period of said electromagnet/anchor couple.

In another embodiment, the apparatus includes means for sensing engine operating conditions and providing a signal to the memory which has means for varying the advance signal in response to the sensed conditions, such as load, fuel characteristics, engine output, knocking, exhaust gas composition, engine ageing, cylinder pressure, temperature, altitude, and the like, and combinations thereof.

The impact approach preferably employs means for detecting a transient in capture current in the receiving (capturing) electromagnet, and the memory is adapted with an algorithm (e.g., in an EPROM) for determining the length of time between current shut-off to the releasing electromagnet and the transient in the opposed capturing electromagnet, and for determining the detachment time therefrom, for example by subtracting the substantially constant flight time which is characteristic of the spring system of that engine.

It should be understood that various modifications within the scope of this invention can be made by one of ordinary skill in the art without departing from the spirit thereof. I therefore wish my invention to be defined by the scope of the appended claims as the prior art will permit, and in view of the specification if need be.

I claim:

1. Method for improving the operation of an internal combustion engine having at least one electromagnetically actuated spring-loaded valve positioning system comprising at least a pair of opposed, spaced-apart electromagnets, an anchor plate movable therebetween, and at least one spring disposed to bias said anchor plate away from contact with at least one of said electromagnets, said anchor plate, one of said electromagnets and said spring comprising an electromagnet/anchor plate/-spring couple, and a control system therefor, comprising the steps of:
    (a) determining the detachment time period lag in release of said anchor plate from an electromagnet-/anchor plate/spring couple, said detachment time period release lag being a function of a compressive force of said spring overcoming the decaying magnetic force of said electromagnet upon deenergization; and
    (b) shutting off current to said electromagnet at a point of time to compensate for said detachment time period release lag.

2. Method as in claim 1 wherein:
    (a) said detachment time period is measured for each individual electromagnet/anchor/spring couple; and which includes the step of:
    (b) presetting the time point for shut-off of said electromagnet by the amount of said detachment time period to obtain the time point at which it is desired the anchor fall away from the electromagnet when activated.

3. Method as in claim 2 wherein said presetting is provided to the control system of said electromagnetically actuated valve system.

4. Method for improving the operation of an internal combustion engine having at least one electromagnetically actuated valve system comprising at least a pair of opposed, spaced-apart electromagnets, an anchor plate movable therebetween and a control system therefor, comprising the steps of:
  (a) determining the detachment time period lag of release of said anchor plate from an electromagnet-/anchor plate couple, said release lag time determination including the steps of:
    (i) sensing the total time between switching and impact of said anchor with said opposed electromagnet during engine operation;
    (ii) determining the detachment time period portion of said total time; and
  (b) shutting off current to said electromagnet at a point of time to compensate for said detachment time period release lag, said current shut-off time point being varied during operation in response to changes in said detachment time.

5. Method as in claim 4 wherein said sensing step includes the step of impact recognition of said anchor with said opposed electromagnet.

6. Method as in claim 4 wherein said impact recognition step comprises sensing a transient in the capture current of said opposed electromagnet.

7. Method as in claim 1 which includes the step of:
  (a) varying said current shut-off time point in response to varying operating conditions selected from at least one of load, fuel characteristics, engine output, knocking, exhaust gas composition, engine ageing, cylinder pressure, temperature, altitude, and combinations thereof.

8. Method as in claim 1 which includes the steps of:
  (a) determining a desired release time point for each anchor; and
  (b) advancing said current shut-off from said desired release time by the amount of said detachment time period.

9. Method as in claim 1 wherein said current shut-off occurs to initiate the closing of said valve.

10. Method as in claim 9 wherein said valve is an intake valve.

11. Method as in claim 9 wherein said valve is an exhaust valve.

12. Method as in claim 4 wherein said current shut-off occurs to initiate the closing of said valve.

13. Method as in claim 12 wherein said valve is an intake valve.

14. Method as in claim 12 wherein said valve is an exhaust valve.

15. Internal combustion engine valve control system comprising in operative combustion:
  (a) means for selective supply of current to at least a pair of opposed valve actuation electromagnets, said electromagnets being disposed to alternately attract and hold anchor plate members moveable therebetween when energized;
  (b) memory means for storing a time point for shut-off of current to at least one of said electromagnets;
  (c) said memory means being settable to provide a signal for causing an advance in the shut-off of current to at least one of said electromagnets by an amount of time corresponding to the detachment time period lag of said anchor from said electromagnet.

16. System as in claim 15 wherein said memory is preset to provide said advance signal in an amount corresponding to individually measured or approximated detachment time period of said electromagnet/anchor couple.

17. System as in claim 15 which includes:
  (a) means for sensing engine operating conditions and providing a signal to said memory;
  (b) said memory means having means for varying said advance signal in response to said sensed conditions.

18. System as in claim 15 which includes:
  (a) means for detecting a transient in capture current in said opposed electromagnet;
  (b) said memory means is adapted with an algorithm for determining the length of time between current shut-off to a first of said electromagnets and the transient in said opposed electromagnet, and for determining the detachment time therefrom.

19. System as in claim 17 wherein said sensed conditions are selected from at least one of load, fuel characteristics, engine output, knocking, exhaust gas composition, engine ageing, cylinder pressure, temperature, altitude, and combinations thereof.

* * * * *